(12) United States Patent
Al-Abbasi et al.

(10) Patent No.: US 10,382,101 B2
(45) Date of Patent: Aug. 13, 2019

(54) METHOD AND APPARATUS FOR IMPLEMENTING SPARSE FINITE-IMPULSE-RESPONSE EQUALIZERS

(71) Applicant: QATAR UNIVERSITY, Doha (QA)

(72) Inventors: Abubakr O. Al-Abbasi, Doha (QA); Ridha Hamila, Doha (QA); Waheed U. Bajwa, Piscataway, NJ (US); Naofal Al-Dhahir, Richardson, TX (US)

(73) Assignee: QATAR UNIVERSITY, Doha (QA)

( * ) Notice: Subject to any disclaimer, the term of this patent is extended or adjusted under 35 U.S.C. 154(b) by 0 days.

(21) Appl. No.: 15/346,388

(22) Filed: Nov. 8, 2016

(65) Prior Publication Data

US 2018/0131548 A1    May 10, 2018

(51) Int. Cl.
  *H04L 25/03*   (2006.01)
  *H04B 7/0413*  (2017.01)
(52) U.S. Cl.
  CPC ..... *H04B 7/0413* (2013.01); *H04L 25/03019* (2013.01); *H04L 25/03987* (2013.01); *H04L 25/03261* (2013.01)
(58) Field of Classification Search
  CPC .............. H04L 25/03019; H04L 25/03987
  USPC ................................................. 375/229, 232
  See application file for complete search history.

(56) References Cited

U.S. PATENT DOCUMENTS

| | | | | |
|---|---|---|---|---|
| 2005/0031045 | A1* | 2/2005 | Mayor | H04B 1/7115 375/260 |
| 2006/0018398 | A1* | 1/2006 | Shamsunder | H04B 1/71052 375/267 |
| 2012/0140797 | A1* | 6/2012 | Malkin | H04B 3/237 375/219 |
| 2013/0286903 | A1* | 10/2013 | Khojastepour | H04L 5/14 370/280 |
| 2014/0108479 | A1* | 4/2014 | Rasmussen | G06F 17/156 708/322 |
| 2016/0014393 | A1* | 1/2016 | Kadambi | G01S 17/89 348/50 |

* cited by examiner

*Primary Examiner* — Kevin M Burd
(74) *Attorney, Agent, or Firm* — Squire Patton Boggs (US) LLP (57) ABSTRACT

A method and apparatus may include receiving a transmission. The method can also include determining a sparsifying dictionary that sparsely approximates a data vector of the transmission. The determining the sparsifying dictionary includes performing a fast Fourier transform and/or an inverse fast Fourier transform. The method also includes configuring a filter based on the determined sparsifying dictionary.

3 Claims, 3 Drawing Sheets

METHOD AND APPARATUS FOR IMPLEMENTING SPARSE FINITE-IMPULSE-RESPONSE EQUALIZERS

BACKGROUND

Field

Certain embodiments of the present invention relate to implementing sparse finite-impulse-response equalizers.

Description of the Related Art

In the technical field of signal processing, a finite impulse response (FIR) equalizer may be considered to be FIR filter whose impulse response is of a finite duration. A FIR filter can be considered to be a digital circuit that is used to filter an input signal. At each point in time, a set of samples of the input signal can be multiplied by coefficients and then summed. The number of samples of the input signal can be referred to as the number of taps of the FIR filter.

SUMMARY

One embodiment is directed to a method. The method may include receiving a transmission. The method may also include determining a sparsifying dictionary that sparsely approximates a data vector of the transmission, wherein the determining the sparsifying dictionary comprises performing a fast Fourier transform and/or an inverse fast Fourier transform. The method may further include configuring a filter based on the determined sparsifying dictionary.

According to an embodiment, the configuring the filter may include configuring a finite impulse response filter. According to another embodiment, the determining the sparsifying dictionary may include determining a sparsifying dictionary that has a smallest worst-case coherence metric. According to yet another embodiment, the performing the fast Fourier transform and/or the inverse fast Fourier transform is performed on a circulant matrix that estimates a Toeplitz matrix. According to a further embodiment, the performing the fast Fourier transform and/or the inverse fast Fourier transform on the circulant matrix replaces performing Cholesky and Eigen factorization.

Another embodiment is directed to an apparatus, which may include at least one processor, and at least one memory including computer program code. The at least one memory and the computer program code may be configured, with the at least one processor, to cause the apparatus at least to receive a transmission. The at least one memory and the computer program code may also be configured, with the at least one processor, to determine a sparsifying dictionary that sparsely approximates a data vector of the transmission, wherein the determining the sparsifying dictionary may include performing a fast Fourier transform and/or an inverse fast Fourier transform. The at least one memory and the computer program code may further be configured, with the at least one processor, to configure a filter based on the determined sparsifying dictionary.

According to an embodiment, configuring the filter may include configuring a finite impulse response filter. According to another embodiment, the determining the sparsifying dictionary may include determining a sparsifying dictionary that has a smallest worst-case coherence metric. According to yet another embodiment, the performing the fast Fourier transform and/or the inverse fast Fourier transform may be performed on a circulant matrix that estimates a Toeplitz matrix. According to a further embodiment, the performing the fast Fourier transform and/or the inverse fast Fourier transform on the circulant matrix replaces performing Cholesky and Eigen factorization.

Another embodiment is directed to a computer program product, embodied on a non-transitory computer readable medium. The computer program product may be configured to control a processor to perform the method described above.

BRIEF DESCRIPTION OF THE DRAWINGS

For proper understanding of the invention, reference should be made to the accompanying drawings, wherein.

DETAILED DESCRIPTION

With single-carrier transmissions over broadband channels, long finite impulse response (FIR) equalizers are typically implemented at high sampling rates to combat the channels' frequency selectivity. However, implementation of such equalizers can be prohibitively expensive, as the design complexity of FIR equalizers increases proportional to the square of the number of nonzero taps in the filter. Sparse equalization, where only a few nonzero taps (and only a few corresponding nonzero coefficients) are employed, is a technique that is used to reduce complexity at the cost of a tolerable performance loss. However, reliably determining the locations of these nonzero coefficients is often very challenging.

Certain embodiments of the present invention are directed to a computationally-efficient method, implemented in software, that designs/configures sparse FIR single input single output (SISO) linear equalizers and sparse FIR multi-input multi-output (MIMO) linear equalizers (LEs). Certain embodiments may also be directed to decision feedback equalizers (DFEs) that perform sparse approximation of a vector (which contains the filter taps) using different sparsifying dictionaries. These sparsifying dictionaries (full row-rank matrices) may be used to sparsely approximate the filter tap vector.

With regard to performing sparse approximation of a vector using different dictionaries, certain methods of the present invention can determine a sparsifying dictionary that leads to the sparsest FIR filter, hence reducing the FIR filter's implementation complexity, subject to performance constraints.

In addition, certain embodiments may be directed to applications that perform channel shortening for both single-carrier and multi-carrier transceivers. As such, certain embodiments of the present invention may significantly reduce an equalizer implementation complexity. Another feature of certain embodiments is directed to reducing a computational complexity of a method for determining a sparse equalizer design. As described below, this reduced computational complexity can be realized by exploiting an asymptotic equivalence of Toeplitz and circulant matrices, where matrix factorizations involved in certain embodiments can be carried out efficiently using fast Fourier transform (FFT) and inverse FFT. There may be negligible performance loss as the number of filter taps increases.

Simulation results demonstrating certain embodiments show that, if a little performance loss is allowed, such an allowance can yield a significant reduction in the number of active filter taps, which, in turn, results in a substantial reduction in the complexity of implementing the FIR equalizers/filters. Consequently, with a reduction in the complexity of the FIR equalizers/filters, a corresponding power consumption can also be decreased because a smaller number of complex multiply-and-add operations are required.

Additionally, simulations demonstrating certain embodiments have shown that a sparsifying dictionary of certain embodiments will generally result in a sparsest FIR filter design. That sparsifying dictionary (full row-rank matrix) may have the smallest worst-case coherence metric. In certain embodiments, the smaller the worst-case coherence, the sparser the equalizer is. The sparsifying dictionary could also be a square, fat or tall matrix. A good sparsifying dictionary may be that which has a small coherence between its columns, i.e., small worst-case coherence. Furthermore, the simulations demonstrate the superiority of certain embodiments in terms of both performance and reduction of computational complexity.

Certain embodiments may be utilized with the following system model, for example. One system model may include a linear time-invariant MIMO inter-symbol interference (ISI) channel with $n_i$ inputs and $n_o$ outputs, for example. The ISI channel can be the channel upon which the input signals are passing through. The output of the ISI channel (distorted by the noise) may be taken as an input to the FIR equalizer. This equalizer may be designed such that the effect of ISI channel is mitigated and/or removed. The received samples from all $n_o$ channel outputs at a sample time k are grouped into a $n_o \times 1$ column vector $y_k$ as follows:

$$y_k = \sum_{l=0}^{v} H_l x_{k-l} + n_k, \qquad (1)$$

where $H_l$ is the $(n_o \times n_i)$ $l^{th}$ channel matrix coefficient, and $x_{k-l}$ is the size $n_i \times 1$ input vector at time k−l. The parameter v (as shown below) is the maximum order of all of the $n_o n_i$ Channel Impulse Responses (CIRs). Over a block of $N_f$ output samples, the input-output relation in (1) above can be written compactly as $$y_{k:k-N_f+1} = H x_{k:k-N_f-n+1} + n_{k:k-N_f+1}. \qquad (2)$$

where $y_{k:k-N_f+1}$, $x_{k:k-N_f-v+1}$ and $n_{k:k-N_f+1}$ are column vectors grouping the received, transmitted, and noise samples, respectively. Additionally, H is a block Toeplitz matrix whose first block row is formed by $\{H_l\}_{l=0}^{l=v}$ followed by zero matrices. It may be useful to define the output auto-correlation and the input-output cross-correlation matrices based on a block of length $N_f$. Using (2), the $n_i(N_f+v) \times n_i (N_f+v)$ input correlation and the $n_o N_f \times n_o N_f$ noise correlation matrices are, respectively, defined by $$R_{xx} \triangleq E[x_{k:k-N_f-v+1} x_{k:k-N_f-v+1}^H]$$

and $$R_{nn} \triangleq E[n_{k:k-N_f+1} n_{k:k-N_f+1}^H].$$

Both the input and noise processes are assumed to be white; hence, their auto-correlation matrices are assumed to be (multiples of) the identity matrix, i.e., $$R_{xx} = I_{n_i(N_f+v)} \text{ and } R_{nn} = \frac{1}{SNR} I_{n_o N_f}.$$

The key matrices used in this disclosure are summarized in Table I.

TABLE I

CHANNEL EQUALIZATION NOTATION AND KEY MATRICES USED IN THIS PAPER.

| Notation | Meaning | Size |
| --- | --- | --- |
| H | Channel matrix | $n_o N_f \times n_i (N_f + v)$ |
| $R_{xx}$ | Input auto-correlation matrix | $n_i (N_f + v) \times n_i (N_f + v)$ |
| $R_{xy}$ | Input-output cross-correlation matrix | $n_i (N_f + v) \times n_o (N_f)$ |
| $R_{yy}$ | Output auto-correlation matrix | $n_o N_f \times n_o N_f$ |
| $R_{nn}$ | Noise auto-correlation matrix | $n_o N_f \times n_o N_f$ |
| $R^\perp$ | $\triangleq R_{xx} - R_{xy} R_{yy}^{-1} R_{yx}$ | $n_i (N_f + v) \times n_i (N_f + v)$ |
| W | FFF matrix cofficients | $n_o N_f \times n_i$ |
| B | FBF matrix cofficients | $n_i (N_f + v) \times n_i$ |

Moreover, the output-input cross-correlation and the output auto-correlation matrices are, respectively, defined as $$R_{yx} \triangleq E[y_{k:k-N_f+1} x_{k:k-N_f-v+1}^H] = HR_{xx}, \text{ and} \qquad (3)$$

$$R_{yy} \triangleq E[y_{k:k-N_f+1} y_{k:k-N_f+1}^H] = HR_{xx} H^H + R_{nn}. \qquad (4)$$

Certain embodiments may determine different sparse FIR equalizer designs for different scenarios. As described below, certain embodiments may be directed to linear equalizers (LEs) for SISO and MIMO systems, respectively, and other embodiments may be directed to decision feedback equalizers (DFEs) for SISO and MIMO systems, respectively.

With regard to Sparse FIR Single-Input Single Output Linear Equalizers (SISO-LE), the received samples are passed through a FIR filter of length $N_f$ for equalization. The resulting error at time k is given by $$e_k = x_{k-\Delta} - \hat{x}_{k-\Delta} - w^H y_{k:k-N_f+1}, \qquad (5)$$

where Δ is the decision delay, typically $0 \leq \Delta \leq N_f + v - 1$, and w denotes the equalizer taps vector whose dimension is $N_f \times 1$. It can be shown that the mean square error (MSE), ξ(w), is given by:

$$\xi(w) = \underbrace{\varepsilon_x - r_\Delta^H R_{yy}^{-1} r_\Delta}_{\xi_m} + \underbrace{(w - R_{yy}^{-1} r_\Delta)^H R_{yy} (w - R_{yy}^{-1} r_\Delta)}_{\xi_e(w)}, \qquad (6)$$

where $\varepsilon_x \triangleq E[x_{k-\Delta}^2]$, $r_\Delta = R_{yx} e_\Delta$, and $e_\Delta$ denotes an $(N_f+v)$-dimensional unit vector that is zero everywhere except in the $(\Delta+1)$-th element where it is one. Since $\xi_m$ does not depend on w, the MSE ξ(w) is minimized by minimizing the term $\xi_e$(w). Hence, the optimum choice for w, i.e., the optimum setting of the equalizer taps, in the minimum mean square error (MMSE) sense, is the Wiener solution:

$$w_{opt} = R_{yy}^{-1} r_\Delta.$$

However, in general, $w_{opt}$ is not sparse, and its implementation complexity increases proportional to $(N_f)^2$, which can be computationally expensive. However, any choice for w other than $w_{opt}$ increases $\xi_e$(w) which leads to a performance loss. This suggests that the excess error $\xi_e(w)$ can be used as a design constraint to achieve a desirable performance-complexity tradeoff.

Specifically, certain embodiments formulate the following problem for the design of a sparse FIR SISO-LE $$\hat{w}_s \triangleq \underset{w \in \mathbb{C}^{N_f}}{\operatorname{argmin}} \|w\|_0 \text{ subject to } \xi_e(w) \leq \delta_{eq}, \tag{7}$$

where $\|w\|_0$ is the number of nonzero elements in its argument and $\delta_{eq}$ can be chosen as a function of the noise variance.

To solve (7), certain embodiments propose a general framework to sparsely design FIR LEs such that the performance loss does not exceed a prespecified limit.

With regard to sparse FIR multiple-input multiple output linear equalizers (MIMO-LE), certain embodiments may define the $k^{th}$ equalization error sample vector in the MIMO setting as $$e_k = [e_{k,1} e_{k,2} \ldots e_{k,n_i}]^T, \tag{8}$$

where $e_{k,i}$ is the equalization error of the $i^{th}$ input stream. Similar to the sparse SISO-LE case, the $k^{th}$ error sample for the $i^{th}$ input stream is expressed as:

$$e_{k,i} = x_{k-\Delta,i} - \hat{x}_k = x_{k-\Delta,i} - w_i^H y_{k:k-N_f+1}, \tag{9}$$

and the MSE, $\xi_i(w_i)$, for the $i^{th}$ input stream has the form $$\xi_i(w_i) = \xi_{m,i} + \underbrace{(w_i - R_{yy}^{-1} r_{\Delta,i})^H R_{yy} (w_i - R_{yy}^{-1} r_{\Delta,i})}_{\triangleq \xi_{ex,i}(w_i)}, \tag{10}$$

where $\xi_{m,i} \triangleq \xi_a - r_{\Delta,i}^H R_{yy}^{-1} r_{\Delta,i} = R_{yx} e_{\Delta,i}$ and $e_{\Delta,i}$ is the $(n_i\Delta+i)$-th column of $I_{ni(N_f+v)}$. The optimum choice for $w_i$ is the complex non-sparse solution $w_{opt,i} = R_{yy}^{-1} r_{\Delta,i}$. Thus, certain embodiments can use $\xi_{ex,i}(w_i)$ as a design parameter to control the performance-complexity tradeoff.

Certain embodiments may be directed to a proposed framework that computes a sparse solution $w_{s,i}$ such that $\xi_{ex,i}(w_i) \leq \delta_{eq,i}$. This condition bounds the amount of the noise in the sparse solution.

With regard to sparse FIR SISO-DFE, the decision feedback equalizer (DFE) of certain embodiments may include two filters: a feedforward filter (FFF) with $N_f$ taps, and a feedback filter (FBF) with $(N_b+1)$ nonzero taps. The FFF and FBF are denoted by and $w_f = [w_{f,0} w_{f,1} \ldots w_{f,N_f-1}]^T$ and $w_b = [0_{l \times \Delta} 1 w_{b,1} \ldots w_{b,N_b} 0_{l \times s}]^T$, $s \triangleq N_f - v - \Delta - N_b - 1$, respectively. Assuming that the decisions are correct, it can be shown that the MSE has the form $$\xi_m(w_b) = w_b^H \underbrace{(R_{xx} - R_{xy} R_{yy}^{-1} R_{yx})}_{R_{x/y}} w_b. \tag{11}$$

Since the $(\Delta+1)^{th}$ location of $w_b$ is unity, minimizing $\xi_m(w_b)$ is a constrained problem of the form $$\hat{w}_b \triangleq \underset{w_b \in \mathbb{C}^{N_f+v}}{\operatorname{argmin}} \xi_m(w_b) \text{ subject to } w_b^H e_\Delta = 1, \tag{12}$$

where $e_\Delta$ denotes the $(N_f+v)$-dimensional unit vector that is zero everywhere except in the $(\Delta+1)^{th}$ entry, where it is one. Moreover, in some scenarios a specific value of $N_b$ is required, for example, due to complexity constraints, and a direct control on the number of the nonzero taps of the FBF is desirable.

To accomplish these goals, certain embodiments express $R_{x/y}$ in (11) as $A_{x/y}^H A_{x/y}$, where $A_{x/y}$ is the square-root matrix of $R_{x/y}$ in the spectral-norm sense, which results from Cholesky or Eigen decompositions. Then, (11) can be written as $$\xi_m(w_b) = w_b^H A_{x/y}^H A_{x/y} w_b \tag{13}$$
$$= \|A_{x/y} w_b\|_2^2$$
$$= \|\tilde{A}_{x/y} \tilde{w}_b + a_{\Delta+1}\|_2^2,$$

where $a_{\Delta+1}$ is the $(\Delta+1)^{th}$ column of $A_{x/y}$, $\tilde{A}_{x/y}$ is composed of all columns of $A_{x/y}$ except $a_{\Delta+1}$ and $\tilde{w}_b$ is formed by all elements of $w_b$ except the $(\Delta+1)^{th}$ entry with unit value. The locations and weights of these taps need to be estimated such that $\xi_m(w_b)$ is minimized. Towards this goal, certain embodiments formulate the following problem for the design of a sparse FIR FBF filter $$\tilde{w}_{b,s} \triangleq \underset{w_b \in \mathbb{C}^{N_f+v}}{\operatorname{argmin}} \|w_b\|_0 \text{ subject to } \xi_m(w_b) \leq \gamma_{eq}, \tag{14}$$

where the threshold $\gamma_{eq}$ is a selected parameter to control the performance loss from the non-sparse highly complex conventional FBF, which is designed based on the MMSE criterion. Once $\tilde{w}_{b,s}$ is calculated, certain embodiments insert the unit tap in the $(\Delta+1)^{th}$ entry to construct the sparse FBF, $w_{b,s}$, vector. Then, the optimum FFF taps (in the MMSE sense) are given by $$w_{f,opt} = R_{yy}^{-1} \beta, \tag{15}$$

where $\beta = R_{yx} w_{b,s}$. Since $w_{f,opt}$ is, again, generally not sparse, certain embodiments propose a sparse implementation for the FFF taps as follows. After computing the feedback filter (FBF) coefficients, $w_{b,s}$, the MSE will be a function only of $w_f$ and has the form $$\xi(w_f) = w_f^H R_{yy} w_f - w_f^H R_{yx} w_{b,s} - w_{b,s}^H R_{yx}^H w_f + w_{b,s}^H R_{xx} w_{b,s} \tag{16}$$
$$= \underbrace{w_{b,s}^H R_{x/y} w_{b,s}}_{\text{independent of } w_f} + \underbrace{(w_f - R_{yy}^{-1} \beta)^H R_{yy} (w_f - R_{yy}^{-1} \beta)}_{\triangleq \xi_{ex}(w_f)}.$$

Thus, $\xi(w_f)$ is minimized by minimizing the term $\xi_{ex}(w_f)$. In particular, certain embodiments formulate the following problem for the design of sparse FIR FFF, $w_f$ $$\hat{w}_{f,s} \triangleq \underset{w_f \in \mathbb{C}^{N_f}}{\operatorname{argmin}} \|w_f\|_0 \text{ subject to } \xi_{ex}(w_f) \leq \tilde{\gamma}_{eq}, \tag{17}$$

where $\tilde{\gamma}_{eq} > 0$ is a design parameter that can be used to control the performance-complexity tradeoff.

With regard to Sparse FIR MIMO-DFE, the FIR MIMO-DFE includes a FFF matrix $$W^H \triangleq [W_0^H W_1^H \ldots W_{N_f-1}^H]. \quad (18)$$

with $N_f$ matrix taps $W^H_i$, each of size $n_o \times n_i$, and a FBF matrix equal to $$\tilde{B}^H = [\tilde{B}_0^H \tilde{B}_0^H \ldots \tilde{B}_{N_b}^H], \quad (19)$$

where each $\tilde{B}^H$ has $(N_b+1)$ taps with size of $n_i \times n_i$. By defining the size $n_i \times n_i$ $(N_f+v)$ matrix $B^H = [0_{n_i \times \Delta} \tilde{B}^H]$, where $0 \leq \Delta \leq N_f+v-1$, it was shown that the MSE can be written as follows $$\xi(B, W) = \underbrace{\text{Trace}\{B^H R^\perp B\}}_{\triangleq \xi_{min}(B)} + \underbrace{\text{Trace}\{S^H R_{yy} S\}}_{\triangleq \xi_{ex}(W,B)}, \quad (20)$$

where
$R^\perp \triangleq R_{xx} - R_{xy} R_{yy}^{-1} R_{yx}$ and $S^H \triangleq W^H - B^H R_{xy} R_{yy}^{-1}$. The second term of the MSE is equal to zero under the optimum FFF matrix filter coefficients, i.e., $W^H = B^H R_{xy} R_{yy}^{-1}$, and the resulting MSE can then be expressed as follows (defining $R^\perp \triangleq A_\perp^H A_\perp$)

$$\xi_m(B) = \text{Trace}\{B^H A_\perp^H A_\perp B\} = \|A_\perp B\|_F^2 \quad (21)$$

$$= \| A_\perp b^{(1)} \ A_\perp b^{(2)} \ \ldots \ A_\perp b^{(n_i)} \|_F^2$$

$$\|A_\perp b^{(1)}\|_2^2 + \|A_\perp b^{(2)}\|_2^2 + \ldots + \|A_\perp b^{(n_i)}\|_2^2$$

where $b(i)$ is the ith column of B. Hence, to compute the FBF matrix filter taps B that minimize $\xi_m(B)$, certain embodiments minimize $\xi_m(B)$ under the identity tap constraint (ITC) where certain embodiments restrict the ith matrix coefficient of B to be equal to the identity matrix, i.e., $B_0 = I_{n_i}$. Towards this goal, certain embodiments rewrite $\xi_m(B)$ as follows $$\xi_m(B) = \sum_{i=1}^{n_i} \|A_\perp^{(i \backslash n_i \Delta + i)} b^{(i \backslash n_i \Delta + i)} + a_{n_i \Delta + i}\|_2^2, \quad (22)$$

where $A_\perp^{(i \backslash n_i \Delta + i)}$ is formed by all columns of $A_\perp$ except the $(n_i \Delta + i)^{th}$ column, i.e., $a_{n_i \Delta+i}$, and $b^{(i \backslash n_i \Delta + i)}$ is formed by all elements of $b^{(i)}$ except the $(n_i \Delta + i)^{th}$ entry with unit value. Then, certain embodiments formulate the following problem for the design of sparse FBF matrix filter taps B $$\hat{b}^{(i \backslash n_i \Delta + i)} \triangleq \underset{}{\operatorname{argmin}} \|b^{(i \backslash n_i \Delta + i)}\|_0 \text{ subject to} \quad (23)$$
$$\|A_\perp^{(i \backslash n_i \Delta + i)} \hat{b}^{(i \backslash n_i \Delta + i)} + a_{n_i \Delta + i}\|_2^2 \leq \gamma_{eq,i}.$$

Once $\hat{b}^{(i \backslash n_i \Delta + i)}$, $\forall i \in n_i$, is calculated, certain embodiments insert the identity matrix $B_0$ in the $i^{th}$ location to form the sparse FBF matrix coefficients, $B_s$. Then, the optimum FFF matrix taps (in the MMSE sense) are determined from (20) to be $$W_{opt} = R_{yy}^{-1} R_{yx} B_s = R_{yy}^{-1} \bar{\beta}. \quad (24)$$

Since $W_{opt}$ is not sparse in general, certain embodiments propose a sparse implementation for the FFF matrix as follows. After computing $B_s$, the MSE will be a function only of W and can be expressed as (defining $R_{yy} \triangleq A_y^H A_y$)

$$\xi(B_s, W) = \xi_m(B_s) + \quad (25)$$
$$\text{Trace}\{(W^H - \bar{\beta}^H R_{yy}^{-1}) A_y^H A_y (W - R_{yy}^{-1} \bar{\beta})\}$$
$$= \xi_m(B_s) + \underbrace{\|A_y W - A_y^{-H} \bar{\beta}\|_F^2}_{\triangleq \xi_{ex}(W)}.$$

By minimizing $\xi_{ex}(W)$, certain embodiments further minimize the MSE. This is achieved by a reformulation for $\xi_{ex}(W)$ to get a vector form of W, as in the case of (23), as follows $$\xi_{ex}(\bar{w}_f) = \left\| \underbrace{(I_{n_i} \otimes A_y^H)}_{\Psi} \underbrace{\text{vec}(W)}_{\bar{w}_f} - \underbrace{\text{vec}(A_y^{-H} \bar{\beta})}_{\sigma_y} \right\|_2^2, \quad (26)$$

where vec is an operator that maps a n×n matrix to a vector by stacking the columns of the matrix. Afterward, certain embodiments solve the following problem to compute the FFF matrix filter taps $$\bar{w}_f \triangleq \operatorname{argmin} \|\bar{w}_f\|_0 \text{ subject to } \xi_{ex}(\bar{w}_f) \leq \bar{\gamma}_{eq}, \quad (27)$$

where $\bar{\gamma}_{eq} > 0$ is used to control the performance-complexity tradeoff and it bounds the amount of the noise in the sparse solution vector.

With regard to implementing a proposed sparse approximation framework, unlike the previous approaches, certain embodiments provide a general framework for designing sparse FIR filters, for both single and multiple antenna systems, that can be considered as resolving a problem of sparse approximation using different dictionaries. Mathematically, this general framework poses the FIR filter design problem as follows $$\hat{z}_s \triangleq \underset{z}{\operatorname{argmin}} \|z\|_0 \text{ subject to } \|K(\Phi z - d)\|_2^2 \leq \epsilon, \quad (28)$$

According to (28), a sparse solution (z) is obtained such that the square norm of the error K (Øz−d) is upper-bounded by a predefined sparsity level (number of nonzero entries of z) or an upper bound on the noise.

In addition, $\Phi$ is the dictionary that will be used to sparsely approximate d, while K is a known matrix and d is a known data vector, both of which change depending upon the sparsifying dictionary $\Phi$. Those variables are generally functions of the system parameters, e.g., cross- and auto-correlation functions. Furthermore, those parameters are obtained based on the problem formulation (as will be shown later) and not necessarily that d and Ø are equal to the received data, ISI channel, respectively. Notice that $\hat{z}_a$ corresponds to one of the elements in $\{w_s, w_{s,i}, w_{b,s}, w_{f,s}, \hat{b}^{(n_i)-}, \bar{w}_{f,s}\}$ and $\in$ is the corresponding element in $\{\delta_{eq}, \delta_{eq,i}, \gamma_{eq}, \gamma_{eq}, \gamma_{eq,i}, \bar{\gamma}_{eq,i}\}$.

For all design problems, certain embodiments perform the suitable transformation to reduce the problem to the one shown in (28). For example, certain embodiments complete the square in (6) to reduce (7) to the formulation given in (28). Hence, one can use any factorization for $R_{yy}$, e.g., in (6) and (10), $R_{x/y}$, e.g., in (11), and $R^\perp$, e.g., in (20), to formulate a sparse approximation problem. Using the Cholesky or Eigen decomposition for $R_{yy}$; $R_{x/y}$ or $R^\perp$, there will be different choices for K, $\Phi$, and d. The matrices Ryy; $R_{x/y}$ or $R^\perp$, may be obtained as shown in Table I. In addition, the sparsifying dictionary can be the square root factor of any of the aforementioned matrices or any linear combinations/transformations of any one of those matrices.

For instance, by defining the Cholesky factorization of $R_{x/y}$, in (11), as $R_{x/y} \triangleq L_{x/y} L^H_{x/y}$, or in the equivalent form $R_{x/y} \triangleq P_{x/y} \Sigma_{x/y} P^H_{x/y} = \Omega_{x/y} \Omega_{x/y}^H$ (where $L_{x/y}$ is a lower-triangular matrix, $P_{x/y}$ is a lower-unit-triangular (unitriangular) matrix and $\Sigma_{x/y}$ is a diagonal matrix), the problem in (28) can, respectively, take one of the forms shown below $$\min_{w_b \in \mathcal{C}^{N_f + n - 1}} \|w_b\|_0 \quad (29)$$
$$\text{s.t. } \|(\tilde{L}^H_{x/y} w_b + l_{\Delta+1})\|_2^2 \leq \gamma_{eq},$$

$$\min_{w_b \in \mathcal{C}^{N_f + n - 1}} \|w_b\|_0 \quad (30)$$
$$\text{s.t. } \|(\tilde{\Omega}^H_{x/y} \tilde{w}_b + p_{\Delta+1})\|_2^2 \leq \gamma_{eq}$$

Recall that $\tilde{\Omega}_{x/y}^H$ is formed by all columns of $\Omega_{x/y}^H$ except the $(\Delta+1)^{th}$ column, $p_{\Delta+1}$ is the $(\Delta+1)^{th}$ column of $\Omega_{x/y}^H$, and $\tilde{w}_b$ is formed by all entries of $w_b$, except the $(\Delta+1)^{th}$ unity entry. Similarly, by writing the Cholesky factorization of $R_{yy}$ in (10) as $R_{yy} \triangleq L_y L_y^H$ or the Eigen decomposition of $R_{yy}$ as $R_{yy} \triangleq U_y D_y U_y^H$, certain embodiments can formulate the problem in (28) as follows:

TABLE II

EXAMPLES OF DIFFERENT SPARSIFYING DICTIONARIES THAT CAN BE USED TO DESIGN $\bar{\omega}_f$ GIVEN IN (27).

| Factorization Type | K | $\Phi$ | d |
|---|---|---|---|
| $R_{yy} = L_y L_y^H$ | I | $I_{n_i} \otimes L_y^H$ | $\text{vec}(L_y^{-1}\bar{\beta})$ |
|  | $L_y^{-1}$ | $I_{n_i} \otimes R_{yy}$ | $\text{vec}(\bar{\beta})$ |
| $R_{yy} = P_y \Lambda_y P_y^H$ | I | $I_{n_i} \otimes \Lambda_y^{\frac{1}{2}} P_y^H$ | $\text{vec}\left(\Lambda_y^{-\frac{1}{2}} P_y^{-1} \bar{\beta}\right)$ |
| $R_{yy} = U_y D_y U_y^H$ | $D_y^{-\frac{1}{2}} U_y^H$ | $I_{n_i} \otimes R_{yy}$ | $\text{vec}(\bar{\beta})$ |
|  | I | $I_{n_i} \otimes D_y^{\frac{1}{2}} U_y^H$ | $\text{vec}\left(D_y^{-\frac{1}{2}} U_y^H \bar{\beta}\right)$ |

$$\min_{w_i \in \mathcal{C}^{n_o N_f}} \|w_i\|_0 \text{ s.t. } \|(L_y^H w_i - L_y^{-1} r_{\Delta,i})\|_2^2 \leq \delta_{eq,i}, \quad (31)$$

$$\min_{w_i \in \mathcal{C}^{n_o N_f}} \|w_i\|_0 \quad (32)$$
$$\text{s.t. } \left\|D_y^{\frac{1}{2}} U_y^H w_i - D_y^{-\frac{1}{2}} U_y^H r_{\Delta,i}\right\|_2^2 \leq \delta_{eq,i}, \text{ and}$$

$$\min_{w_i \in \mathcal{C}^{n_o N_f}} \|w_i\|_0 \text{ s.t. } \|L_y^{-1}(R_{yy} w_i - r_{\Delta,i})\|_2^2 \leq \delta_{eq,i}. \quad (33)$$

Note that the sparsifying dictionaries in (31), (32) and (33) are $L_y^H$, $D_y^{1/2} U_y^H$ and $R_{yy}$, respectively. Furthermore, the matrix K is an identity matrix in all cases except in (33), where it is equal to $L_y^{-1}$. Additionally, some possible sparsifying dictionaries that can be used to design a sparse FFF matrix filter, given in (27), are shown in Table II.

It is worth pointing out that several other sparsifying dictionaries can be used to sparsely design FIR LEs, FBF and FFF matrix taps.

The problem of designing sparse FIR filters can be cast into one of sparse approximation of a vector by a fixed dictionary. The general form of this problem is given by (28). To solve this problem, certain embodiments use the Orthogonal Matching Pursuit (OMP) greedy algorithm [18] that estimates $\hat{z}$, by iteratively selecting a set S of the sparsifying dictionary columns (i.e., atoms $\phi_i$'s) of $\Phi$ that are most correlated with the data vector d and then solving a restricted least-squares problem using the selected atoms. The OMP stopping criterion can be either a predefined sparsity level (number of nonzero entries) of $z_s$ or an upper-bound on the Projected Residual Error (PRE), i.e., "K Residual Error."

Unlike conventional compressive sensing techniques, where the measurement matrix is a fat matrix, the sparsifying dictionary in the framework of certain embodiments is either a tall matrix (fewer columns than rows) with a full column rank as in (29) and (30) or a square one with full rank as in (31)-(33). However, OMP and similar methods can still be used for obtaining $\hat{z}_s$ if $R_{yy}$, $R_{x/y}$ and $R^\perp$ can be decomposed into $\Psi\Psi^H$ and if the data vector d is compressible.

A next challenge is to determine the best sparsifying dictionary for use in the framework of certain embodiments. It is known that the sparsity of the OMP solution tends to be inversely proportional to the worst-case coherence $$\mu(\Phi), \mu(\Phi) \triangleq \max_{i \neq j} \frac{|\langle \phi_i, \phi_j \rangle|}{\|\phi_i\|_2 \|\phi_j\|_2}. \quad [21], [22]$$

Notice that $\mu(\Phi) \in [0, 1]$. Certain embodiments investigate the coherence of the dictionaries involved in the setup.

Certain embodiments are directed to implementing a reduced-complexity design for the FIR filters discussed above, including LEs and DFEs, for both SISO and MIMO systems. The proposed designs involve Cholesky factorization and/or Eigen decomposition, whose computational costs could be large for channels with large delay spreads. For all proposed designs, the suitable transformation (i.e., Cholesky or eigen decomposition) is performed to reduce the design problem to the one given in (28). In (29)-(31), it can be noticed that either Cholesky or eigen decomposition is needed to have the problems formulated in the given forms. These sparsifying dictionaries may be used to sparsely design FIR LEs, FBF and FFF filters. In summary, the proposed design method for the sparse FIR filters may involve the following steps:

1) An estimate for the channel between the input(s) and the output(s) of the actual transmission channel is obtained. Then, the matrices defined in Table I are computed.
2) The required matrices involved in our design, i.e., Rx/y, R⊥ or Ryy, are factorized using reduced-complexity design discussed below.
3) Based on a desired performance-complexity tradeoff, $\in$ is computed. Afterward, the dictionary with the smallest coherence is selected for use in designing the sparse FIR filter.
4) The parameters $\Phi$, d, and K are jointly used to estimate the locations and weights of the filter taps using the OMP algorithm.

For a Toeplitz matrix, the most efficient algorithms for Cholesky factorization are Levinson or Schur algorithms, which involve $O(M^2)$ computations, where M is the matrix dimension.

In contrast, since a circulant matrix is asymptotically equivalent to a Toeplitz matrix for reasonably large dimensions, the Eigen decomposition of a circulant matrix can be computed efficiently using the fast Fourier transform (FFT) and its inverse with only $O(M\log_2(M))$ operations. Certain embodiments can use this asymptotic equivalence between Toeplitz and circulant matrices to carry out the computations needed for $R_{yy}$, $R_{x/y}$ and $R^\perp$ factorizations efficiently using the FFT and inverse FFT. To further illustrate, Toeplitz and circulant matrices are asymptotic in the output block length which is equal to the time span (not number of nonzero taps) of the FFF. This asymptotic equivalence implies that the eigenvalues of the two matrices behave similarly. Furthermore, it also implies that factors, products, and inverses behave similarly In addition, direct matrix inversion can be avoided when computing the coefficients of the filters. This approximation turns out to be quite accurate from simulations as will be shown later.

It is well known that a circulant matrix, C, has the discrete Fourier transform (DFT) basis vectors as its eigenvectors and the DFT of its first column as its eigenvalues. Thus, an M×M circulant matrix C can be decomposed as $$C = \frac{1}{M} F_M^H \Lambda_c F_M,$$

where $F_M$ is the DFT matrix with $f_{k,l}=e^{-j2\pi kl/M}$, $0 \le k$, $l \le M-1$, and $A_c$ is an M×M diagonal matrix whose diagonal elements are the M-point DFT of $c=\{c\}_{i=0}^{i=M-1}$, the first column of the circulant matrix. Further, from the orthogonality of DFT basis functions, $$F_M^H F_M = F_M F_M^H = MI_M \text{ and } F_N^H F_N = MI_{N+1}$$

where $F_N$ is an M×N matrix, but $F_N F_N^H \ne M I_{N+1}$ and instead $$F_N F_N^H = N[I_N \ldots I_N]^T [I_N \ldots I_N].$$

$\overline{R}_{yy}$, $\overline{R}_{yx}$, $\overline{R}_{x/y}$ and $\overline{R}^\perp$ denote the circulant approximations to the matrices $R_{yy}$, $R_{yx}$, $R_{x/y}$ and $R^\perp$ respectively.

In addition, certain embodiments denote the noiseless channel output vector as $\tilde{y}$, i.e., $\tilde{y}=Hx$.

Certain embodiments first derive the circulant approximation for the block Toeplitz matrix $R_{yy}$, when $n_o \le 2$, and the case of SISO systems follows as a special case of the block Toeplitz case by setting $n_o=1$.

The autocorrelation matrix $\overline{R}_{yy}$ is computed as $$\overline{R}_{yy} = \underbrace{E[\tilde{y}_k \tilde{y}_k^H]}_{\overline{R}_{\tilde{y}\tilde{y}}} + \underbrace{\frac{1}{SNR}}_{\sigma_n^2} I_{N_f}. \qquad (37)$$

To approximate the block Toeplitz $R_{yy}$ as a circulant matrix, certain embodiments assume that $\{\tilde{y}_k\}$ is cyclic. Hence, $E[\tilde{y}_k \tilde{y}_b]$ can be approximated as a time-averaged autocorrelation function as follows (defining $L=n_o N_f$)

$$\overline{R}_{\tilde{y}\tilde{y}} = \frac{1}{N_f} \sum_{k=0}^{N_f-1} \tilde{y}_k \tilde{y}_k^H = \frac{1}{N_f} C_{\tilde{Y}} C_{\tilde{Y}}^H \qquad (38)$$

-continued $$= \frac{1}{N_f} \left( \frac{1}{L} F_L^H \Lambda_{\tilde{Y}} F_{N_f} \right) \left( \frac{1}{L} F_{N_f}^H \Lambda_{\tilde{Y}}^H F_L \right)$$

$$= \frac{1}{L^2} F_L^H \Lambda_{\tilde{Y}} \begin{bmatrix} I_{N_f} \\ \vdots \\ I_{N_f} \end{bmatrix} \underbrace{[I_{N_f} \ldots I_{N_f}]}_{n_o \text{ blocks}} \Lambda_{\tilde{Y}}^H F_L$$

$$= \frac{1}{L^2} F_L^H \begin{bmatrix} \Lambda_{\tilde{Y}^1} \\ \vdots \\ \Lambda_{\tilde{Y}^{n_o}} \end{bmatrix} [\Lambda_{\tilde{Y}^1}^H \ldots \Lambda_{\tilde{Y}^{n_o}}^H] F_L,$$

where $F_L$ is a DFT matrix of size L×L, $F_{N_f}$ is a DFT matrix of size L×$N_f$, the column vector $\underline{\tilde{Y}}$ is the L-point DFT of $\tilde{y}_1=[\tilde{y}_{N_f-1}^T \tilde{y}_{N_f-2}^T \ldots \tilde{y}_0^T]$, $\underline{\tilde{Y}}^1$ is the $i^{th}$ subvector of $\underline{\tilde{Y}}$, i.e., $\underline{\tilde{Y}}=[\underline{\tilde{Y}}^{1^T} \underline{\tilde{Y}}^{2^T} \ldots \underline{\tilde{Y}}^{n_o^T}]^T$, $\tilde{y}_i$ is the $n_o \times 1$ output vector and $C_{\tilde{y}}=\text{circ}(\tilde{y}_1)$ where circ denotes a circulant matrix whose first column is $\tilde{y}_1$. Then, $$\overline{R}_{yy} = \overline{R}_{\tilde{y}\tilde{y}} + n_o \sigma_n^2 I_{n_o} N_f \qquad (39)$$

$$= \frac{1}{L^2} F_L^H \underbrace{\begin{bmatrix} \Lambda_{\tilde{Y}^1} \\ \vdots \\ \Lambda_{\tilde{Y}^{n_o}} \end{bmatrix} [\Lambda_{\tilde{Y}^1}^H \ldots \Lambda_{\tilde{Y}^{n_o}}^H]}_{\Psi_{\tilde{Y}}^H} F_L + n_o \sigma_n^2 I_L$$

$$= \frac{1}{L^2} F_L^H (\Psi_{\tilde{Y}} \Psi_{\tilde{Y}}^H + n_o L \sigma_n^2 I_L) F_L = \Sigma \Sigma^H.$$

Using the matrix inversion lemma, the inverse of $\overline{R}_{yy}$ is $$\overline{R}_{yy}^{-1} = \left\{ \frac{1}{L^2} F_L^H (\Psi_{\tilde{Y}} \Psi_{\tilde{Y}}^H + n_o L \sigma_n^2 I_L) F_L \right\}^{-1} \qquad (40)$$

$$= F_L^H (\Psi_{\tilde{Y}} \Psi_{\tilde{Y}}^H + n_o L \sigma_n^2 I_L)^{-1} F_L$$

$$= \frac{1}{n_o L \sigma_n^2} F_L^H (I_L - \Psi_{\tilde{Y}} \Lambda_Q^{-1} \Psi_{\tilde{Y}}^H) F_L, \text{ where}$$

$$Q = \underbrace{\sum_{i=1}^{n_o} |||\tilde{Y}^i|||^2}_{\sigma} + n_o L \sigma_n^2 1_L.$$

Here, $|||\cdot|||^2$ is defined
as the element-wise norm square $$|||[a_0 \ldots a_{N_f-1}]^H|||^2 = [|a_0|^2 \ldots |a_{N_f-1}|^2]^H. \qquad (41)$$

Notice that $\Psi_{\underline{\tilde{Y}} \underline{\tilde{Y}}}^H = \Sigma_{n=1}^{n^0} |||\tilde{Y}^i|||^2 = N_f \Sigma_{i=1}^{n^0} |||\underline{H}^i|||^3$. Without loss of generality, certain embodiments can express the noiseless channel output sequence $\tilde{y}_k$ in the discrete frequency domain as a column vector as follows $$\underline{\tilde{Y}} = \underline{H}^H \odot \underline{P}_\Delta \odot \underline{\tilde{X}} \qquad (42)$$

where $\odot$ denotes element-wise multiplication, $\underline{\tilde{X}}=[\underline{X}^T \ldots \underline{X}^T]^T$ where X is the DFT of the data vector, $\underline{P}_\Delta=[\underline{\tilde{P}}_\Delta^T \ldots \underline{\tilde{P}}_\Delta^T]^T$.

$\underline{\tilde{P}}_\Delta = [1 e^{-j2\times\Delta/N^d} \ldots e^{-2\times(N^d-1)\Delta/N^f}]^T$, and H is the DFT of the CIRs, $\underline{H}=[\underline{H}^{1T} \ldots \underline{H}^{n_o T}]^T$.

To illustrate, for $n_0=1$, $R_{yy}$ in (39) reduces to $$\tilde{R}_{yy} = \tilde{R}_{\tilde{y}\tilde{y}} + \sigma_n^2 I_{N_f} = F_{N_f}^H (\Lambda_{Q1}) F_{N_f} = QQ^H, \qquad (43)$$

where
$Q_1 = N_f \|\underline{H}\|^2 + \sigma_n^2 N_f 1_{N_f}$, $\underline{H}$ is the Nf-point DFT of the CIR h and $\underline{P}_\Delta = \tilde{\underline{P}}\Delta$. Similarly, after some algebraic manipulations, $\overline{R}^\perp$ can be expressed as $$\overline{R}^\perp = \frac{1}{L} F_N^H \left( I_N - \begin{bmatrix} I_M \\ \vdots \\ I_M \end{bmatrix} \Lambda_{y \oslash y} [I_M \ \cdots \ I_M] \right) F_N \quad (44)$$

$$= \Theta \Theta^H,$$

where ⌀ denotes element-wise division and $N = n_i(N_f + v)$. Additionally, $\overline{R}_{x/y}$ can be expressed as $$\overline{R}_{x/y} = R_{xx} - \overline{R}_{yx}^H \overline{R}_{yy}^{-1} \overline{R}_{yx} \quad (45)$$

$$= R_{xx} - \overline{R}_{yx}^H \overline{R}_{yy}^{-1} \left\{ \frac{1}{N^2} F_{N_f}^H (\Lambda_{\underline{Y}} \Lambda_{\underline{X}}^H) F_N \right\}$$

$$= R_{xx} - \overline{R}_{yx}^H \times$$

$$\left\{ \frac{1}{N^2 \sigma_n^2} F_{N_f}^H (\Lambda_{\underline{Y}} \Lambda_{\underline{X}}^H - \Lambda_{\underline{Y}} \Lambda_{(\overline{\theta} \oslash \theta)} \Lambda_{\underline{X}}^H) F_N \right\}$$

$$= I_N - \overline{R}_{xy} \left\{ \frac{1}{N \sigma_n^2} F_N^H (\Lambda_{\underline{Y}} \Lambda_\theta^{-1} \Lambda_{\underline{X}}^H) F_N \right\}$$

$$= I_N - \left\{ \frac{1}{N^2} F_N^H (\Lambda_{\underline{X}} \Lambda_{\underline{Y}}^H \Lambda_{\underline{Y}} \Lambda_\theta^{-1} \Lambda_{\underline{X}}^H) F_N \right\}$$

$$= \frac{1}{N^2} F_N^H (N I_N - \Lambda_{\underline{X}} \Lambda_{(\overline{\theta} \oslash \theta)} \Lambda_{\underline{X}}^H) F_N$$

$$= \frac{1}{N} F_N^H (I_N - \Lambda_{(\overline{\theta} \oslash \theta)}) F_N = \Gamma \Gamma^H,$$

where $N = N_f + v$, $F_N$ is an N×N DFT matrix, $F_{Nf}$ is an N×$N_f$ DFT matrix, $\theta = \overline{\theta} + N\sigma_n^2 1_N$ and $\overline{\theta} = \|\|\underline{\tilde{Y}}\|\|^2$. Note that $\underline{\tilde{Y}}$ is the N-point DFT of $[\tilde{y}_{N_f}^T \tilde{y}_{N_f-1}^T \ldots \tilde{y}_1^T]$.

Using this low complexity fast computation matrix factorization approach, certain embodiments are able to design the FIR filters in a reduced-complexity manner, where neither a Cholesky nor an Eigen factorization is needed. Furthermore, direct inversion of the matrices involved in the design of filters is avoided.

Certain embodiments of the present invention can be used in the transceivers of single-carrier and multi-carrier wireless/wirelines communication systems. For example, certain embodiments of the present invention can be used in LTE, WiFi, DSL, and power line communications (PLC) modems.

Unlike earlier works, as described below, certain embodiments are directed to a method that transforms a problem of designing sparse finite-impulse response (FIR) linear equalizers, non-linear decision-feedback equalizers (DFEs), and channel-shortening equalizers into a problem of determining a sparsest-approximation of a vector in different dictionaries, for both single and multiple antenna systems.

In addition, several choices of the sparsifying dictionaries are compared by methods of certain embodiments, in terms of their worst-case coherence metric, which determines their sparsifying effectiveness. In addition, certain embodiments reduce the computational complexity of the sparse equalizer design process by exploiting an asymptotic equivalence of Toeplitz and circulant matrices. The superiority of certain embodiments, compared to conventional high-complexity methods, is demonstrated through numerical experiments.

The optimum FIR SISO/MIMO LEs and DFEs were investigated, where the design complexity of the equalizers is proportional to the product of the number of input and output streams. Sparse FIR equalizers and sparse channel shortening equalizers (CSEs) were proposed. However, designing such equalizers involved inversion of large matrices and Cholesky factorization, whose computational cost could be large for channels with large delay spreads (which is the case in broadband communications).

The use of higher sampling rates associated with broadband communications and more sophisticated signal processing schemes increase the complexity of equalizers considerably. Signal processing schemes may be based on multiple-antenna (MIMO) technology, for example. Hence, certain embodiments of the present invention are directed to an effective solution where the equalizers can be computed in software and implemented in either software or hardware at practical complexity levels.

Certain embodiments are directed to a general method that transforms the problem of designing sparse finite-impulse response (FIR) linear equalizers, non-linear decision-feedback equalizers (DFEs), and channel-shortening equalizers into the problem of sparsest-approximation of a vector in different dictionaries, for both single and multiple antenna systems.

Additionally, several choices of the sparsifying dictionaries are compared in terms of a worst-case coherence metric, which determines their sparsifying effectiveness. In addition, certain embodiments reduce the computational complexity of the sparse equalizer design process by exploiting the asymptotic equivalence of Toeplitz and circulant matrices.

The superiority of certain embodiments compared to conventional high-complexity methods has been demonstrated through numerical experiments.

Figure 1:
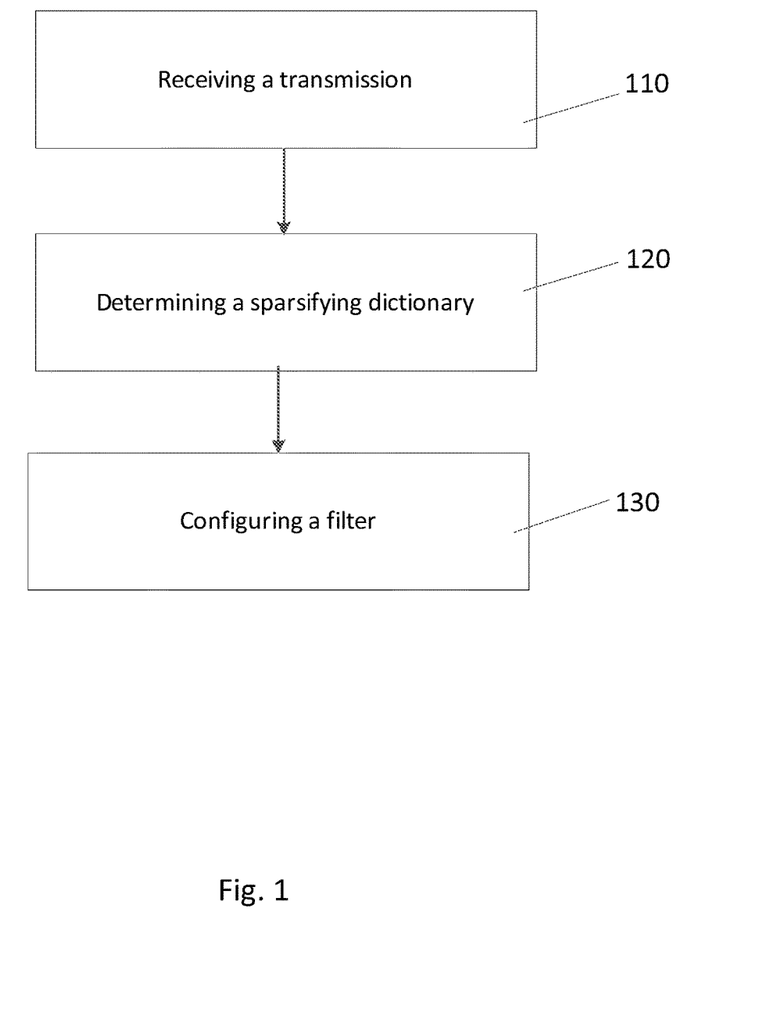
FIG. 1 illustrates a flowchart of a method in accordance with certain embodiments of the invention.

FIG. 1 illustrates a flowchart of another method in accordance with certain embodiments of the invention. The method may include, at 110, receiving a transmission. The method can also include, at 120, determining a sparsifying dictionary that sparsely approximates a data vector of the transmission. The determining the sparsifying dictionary comprises performing a fast Fourier transform and/or an inverse fast Fourier transform. The method can also include, at 130, configuring a filter based on the determined sparsifying dictionary.

Figure 2:
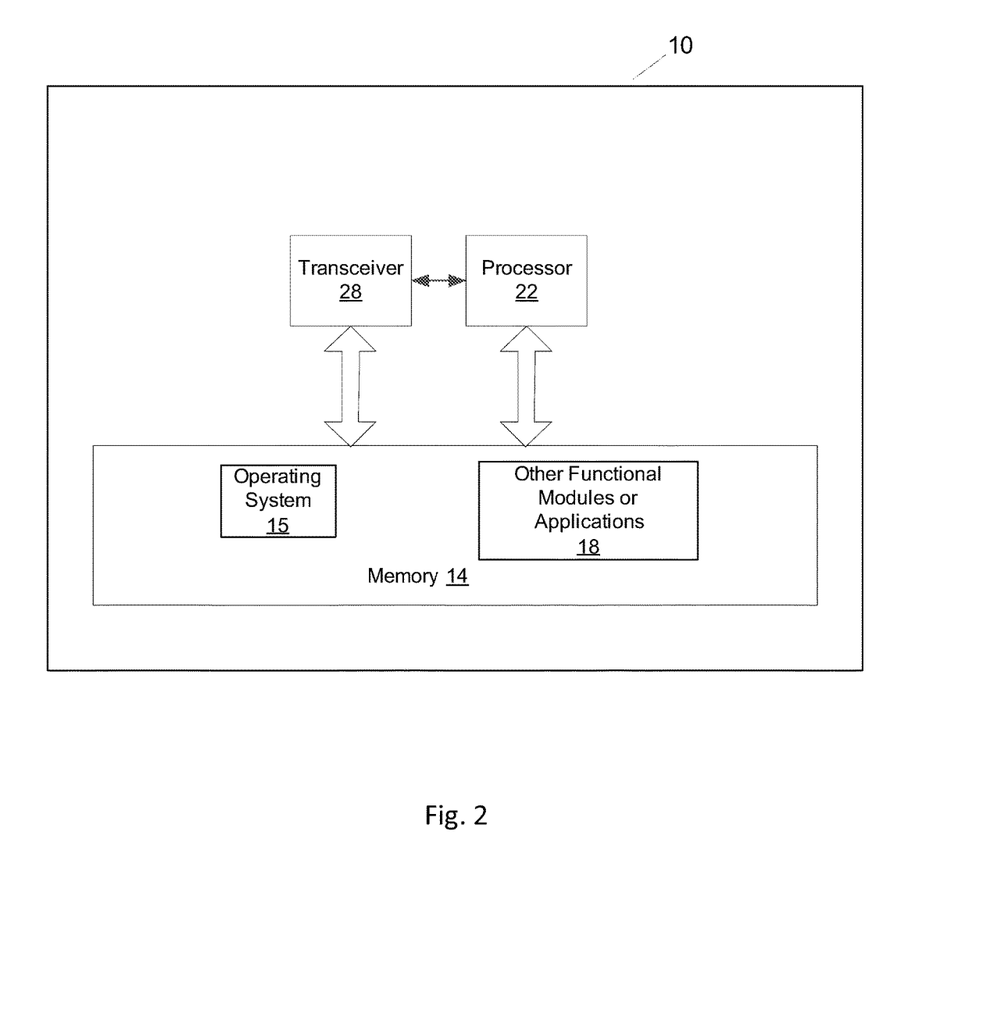
FIG. 2 illustrates an apparatus in accordance with certain embodiments of the invention.

FIG. 2 illustrates an apparatus in accordance with certain embodiments of the invention. In one embodiment, the apparatus can be a receiver or transceiver, for example. The apparatus can be implemented in any combination of hardware and software, for example. Apparatus 10 can include a processor 22 for processing information and executing instructions or operations. Processor 22 can be any type of general or specific purpose processor. While a single processor 22 is shown in FIG. 2, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 may include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 3:
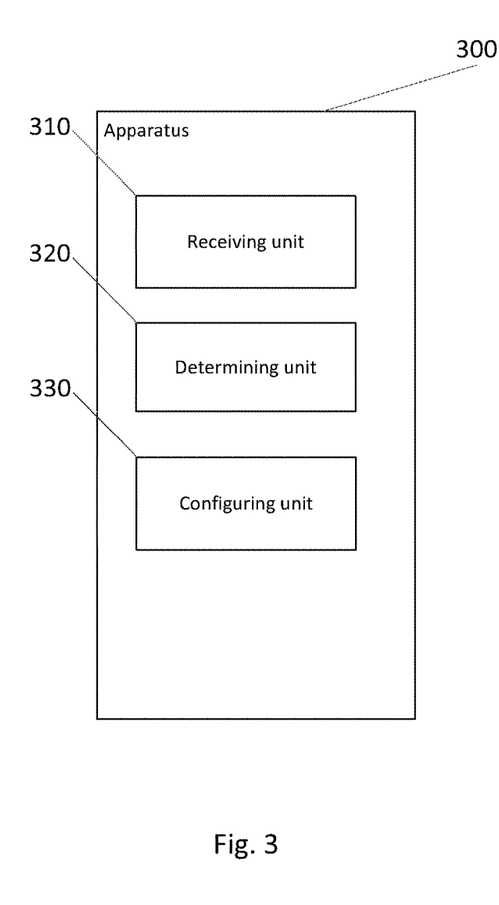
FIG. 3 illustrates an apparatus in accordance with certain embodiments of the invention.

FIG. 3 illustrates an apparatus in accordance with certain embodiments of the invention. Apparatus 300 can include a receiving unit 310 that receives a transmission. Apparatus 300 can also include a determining unit 320 that determines a sparsifying dictionary that sparsely approximates a data vector of the transmission. The determining the sparsifying dictionary comprises performing a fast Fourier transform and/or an inverse fast Fourier transform. Apparatus 300 can also include a configuring unit 330 that configures a filter based on the determined sparsifying dictionary.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   receiving a transmission;
   determining a sparsifying dictionary ($\Phi$) that sparsely approximates a data vector (d) of the transmission by performing a fast Fourier transform and/or an inverse fast Fourier transform to decompose a dictionary matrix and the data vector (d);
   projecting the data vector (d) into a lower dimensional vector space; and
   configuring a filter based on the determined sparsifying dictionary ($\Phi$) by tuning a performance of the filter according to a predefined performance-complexity tradeoff level ($\epsilon$),
   wherein the performing the fast Fourier transform and/or the inverse fast Fourier transform is performed on a circulant matrix that estimates a Toeplitz matrix,
   wherein the performing the fast Fourier transform and/or the inverse fast Fourier transform on the circulant matrix replaces performing Cholesky and Eigen factorization,
   wherein the configuring the filter comprises configuring a finite impulse response filter,
   wherein the method further comprises sparsing a time-domain impulse response of the finite impulse response filter,
   wherein the determining the sparsifying dictionary ($\Phi$) comprises determining a sparsifying dictionary ($\Phi$) that has a smallest worst-case coherence metric,
   wherein the worst-case coherence metric is a similarity measure between columns of a design matrix (K),
   wherein the smaller the worst-case coherence metric is, the less similar the columns are,
   wherein the method further comprises jointly using the sparsifying dictionary ($\Phi$), the data vector (d), and the design matrix (K)
   by passing the sparsifying dictionary ($\Phi$), the data vector (d), and the design matrix (K) into an orthogonal matching pursuit greedy algorithm to obtain an estimate of an unknown vector (z), and
   by minimizing $\|K(\Phi z - d)\|_2^2$,
   wherein values of the predefined performance-complexity tradeoff level ($\epsilon$) determine a sparsity level and complexity level, a number of nonzero active taps, and a performance level of the filter, and
   wherein the sparsifying dictionary ($\Phi$) has the lowest coherence out of a plurality of sparsifying dictionaries.

2. A computer program product, embodied on a non-transitory computer readable medium, the computer program product configured to control a processor to perform a method according to claim 1.

3. An apparatus, comprising:
   at least one processor; and
   at least one memory including computer program code,
   the at least one memory and the computer program code configured, with the at least one processor, to cause the apparatus at least to
   receive a transmission;
   determine a sparsifying dictionary ($\Phi$) that sparsely approximates a data vector (d) of the transmission by performing a fast Fourier transform and/or an inverse fast Fourier transform to decompose a dictionary matrix and the data vector (d);
   project the data vector (d) into a lower dimensional vector space; and
   configure a filter based on the determined sparsifying dictionary ($\Phi$) by tuning a performance of the filter according to a predefined performance-complexity tradeoff level ($\epsilon$),
   wherein the performing the fast Fourier transform and/or the inverse fast Fourier transform is performed on a circulant matrix that estimates a Toeplitz matrix, wherein the performing the fast Fourier transform and/or the inverse fast Fourier transform on the circulant matrix replaces performing Cholesky and Eigen factorization, wherein configuring the filter comprises configuring a finite impulse response filter, wherein the at least one memory and the computer program code are further configured, with the at least one processor, to cause the apparatus at least to sparse a time-domain impulse response of the finite impulse response filter, wherein the determining the sparsifying dictionary ($\Phi$) comprises determining a sparsifying dictionary ($\Phi$) that has a smallest worst-case coherence metric, wherein the worst-case coherence metric is a similarity measure between columns of a design matrix (K), wherein the smaller the worst-case coherence metric is, the less similar the columns are, and wherein the at least one memory and the computer program code configured, with the at least one processor, to cause the apparatus at least to jointly use the sparsifying dictionary ($\Phi$), the data vector (d), and the design matrix (K)

by passing the sparsifying dictionary ($\Phi$), the data vector (d), and the design matrix (K) into an orthogonal matching pursuit greedy algorithm to obtain an estimate of an unknown vector (z), and by minimizing $\|K(\Phi z-d)\|_2^2$, wherein values of the predefined performance-complexity tradeoff level ($\epsilon$) determine a sparsity level and complexity level, a number of nonzero active taps, and a performance level of the filter, and wherein the sparsifying dictionary ($\Phi$) has the lowest coherence out of a plurality of sparsifying dictionaries.

* * * * *